US012658647B2

(12) United States Patent
Chen et al.

(10) Patent No.: US 12,658,647 B2
(45) Date of Patent: Jun. 16, 2026

(54) ELECTRICAL CONNECTOR WITH IMPROVED GROUNDING TERMINALS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Ming-Yue Chen, New Taipei (TW); Ming-Lun Szu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 264 days.

(21) Appl. No.: 18/406,201

(22) Filed: Jan. 7, 2024

(65) Prior Publication Data

US 2024/0235120 A1 Jul. 11, 2024

(30) Foreign Application Priority Data

Jan. 7, 2023 (CN) ......................... 202320036869.6

(51) Int. Cl.
*H01R 13/646* (2011.01)
*H01R 13/42* (2006.01)
*H01R 13/6585* (2011.01)

(52) U.S. Cl.
CPC ........... *H01R 13/646* (2013.01); *H01R 13/42* (2013.01); *H01R 13/6585* (2013.01)

(58) Field of Classification Search
None
See application file for complete search history.

(56) References Cited

U.S. PATENT DOCUMENTS 4,927,369 A 5/1990 Grabbe et al.
5,308,252 A * 5/1994 Mroczkowski .... H01R 13/2435 439/591
5,498,166 A * 3/1996 Rothenberger .... H01R 13/5202 439/66
5,653,598 A 8/1997 Grabbe
5,957,703 A * 9/1999 Arai ....................... H01R 12/52 439/591

(Continued)

FOREIGN PATENT DOCUMENTS

CN 107565235 A 1/2018
CN 107946805 A 4/2018

(Continued)

*Primary Examiner* — Tho D Ta
(74) *Attorney, Agent, or Firm* — Ming Chieh Chang

(57) ABSTRACT

An electrical connector includes: an insulating housing and a metal plate retained in a slot defined on the insulating housing. The metal plate includes plural terminals connecting with each other in a transverse direction, each of the terminals having a shielding part defining an upper face and a lower face and an upper elastic arm and lower elastic arm slantwise extending from a first end to a second end of the shielding part, wherein each of the upper elastic arm and the lower elastic arm defines a free end bending toward each other and slides along an end face of the second end of the shielding part when the upper elastic arm and lower elastic arm are pressed towards each other.

17 Claims, 7 Drawing Sheets

(56) References Cited

U.S. PATENT DOCUMENTS

| | | | |
|---|---|---|---|
| 7,052,284 | B2 | 5/2006 | Liao et al. |
| 7,160,115 | B2 | 1/2007 | Huang et al. |
| 9,425,525 | B2 | 8/2016 | Walden et al. |
| 10,797,424 | B2 | 10/2020 | Hsu |

FOREIGN PATENT DOCUMENTS

| | | | |
|---|---|---|---|
| CN | 108110455 | B | 8/2020 |
| CN | 218385850 | U | 1/2023 |
| CN | 218940038 | U | 4/2023 |
| TW | M587838 | U | 12/2019 |

* cited by examiner

ELECTRICAL CONNECTOR WITH IMPROVED GROUNDING TERMINALS

BACKGROUND OF THE INVENTION

Field of the Invention

The present invention relates to an electrical connector for connecting an electronic package.

Description of Related Arts

U.S. Pat. No. 4,927,369 discloses a connector for connecting a chip to a mother board, including an insulating housing and a plurality of contact element disposed in cavities 30 of the insulating housing. Each contact element includes a bight with a contacting face and a pair of identical loop-shaped contact springs 42, 44 in mirror image symmetry and being connected by a bight 46. Each contact spring 42, 44 comprises spring arm 48, presenting a contact nose 50 at one end and being connected at its other end by way of a bight 52 and an inner arm 54 to the bight 46 and thus to the other contact spring. Each nose 50 has an extension 56 directed towards the bight 46 for contacting with the bight 46. Each cavity 30 is defined by opposed side walls 60, opposed end walls 62 and 64, and top and bottom walls 63 and 65, in which openings 36 and 38 are formed, respectively.

As the size of the contacting face of the bight 52 is affected by the thickness of the terminal which is limited in this field, the contacting face of the bight is very small. In addition, it is hard to fix the contact element into the cavity correctly as the whole contact element is formed by bending slender strip. Therefore, the contact spring 42 has a poor contact with the contacting face of the bight 52 as the contact element is prone to being installed incorrectly and the contacting face of the bight is small.

Therefore, it is desired to provide an electrical connector with improved grounding terminals.

SUMMARY OF THE INVENTION

An object of the present invention is to provide an electrical connector with improved grounding terminals. To achieve the above object, an electrical connector comprises: an insulating housing; plural rows of signal terminals disposed in the insulating housing; and plural rows of grounding terminals disposed in the insulating housing and between every two adjacent rows of signal terminals, each of the grounding terminals comprising a main part retained in the insulating housing and an upper elastic arm and a lower elastic arm, the upper elastic arm having an upper contacting portion and an upper end folded downward from the upper contacting portion, the lower elastic arm having a lower contacting portion and a lower end folded upwards from the lower contacting portion; wherein the main part defines a first end, a second end opposite to the first end, an upper face, and a lower face, the second end defines an end face facing an adjacent grounding terminal, the upper elastic arm extends from the upper face at the first end toward the second end, the lower elastic arm extends from the lower face at the first end toward the second end, and the upper end and the lower end touch the end face when the upper and lower elastic arms are pressed toward each other.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
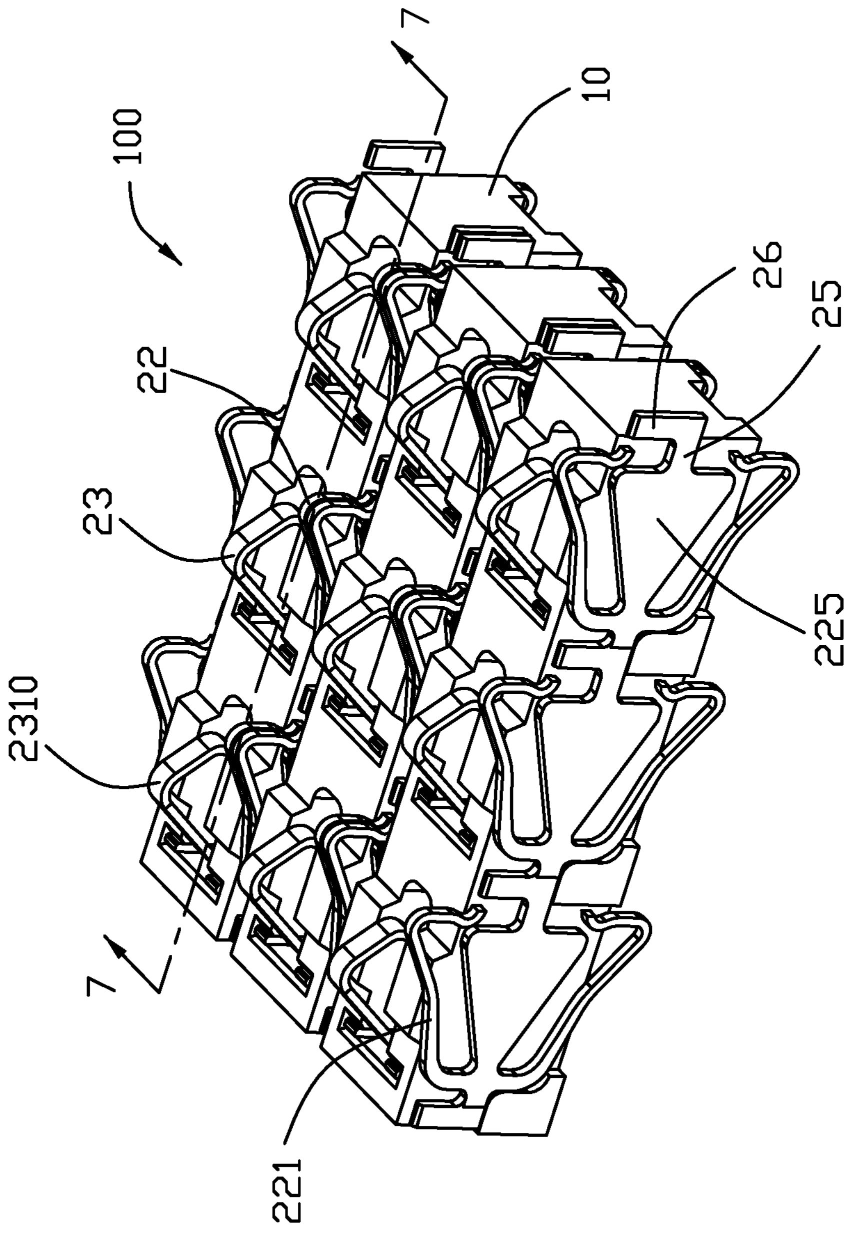
FIG. 1 is a top perspective view of an electrical connector in part according to a first embodiment of this present invention.
Figure 2:
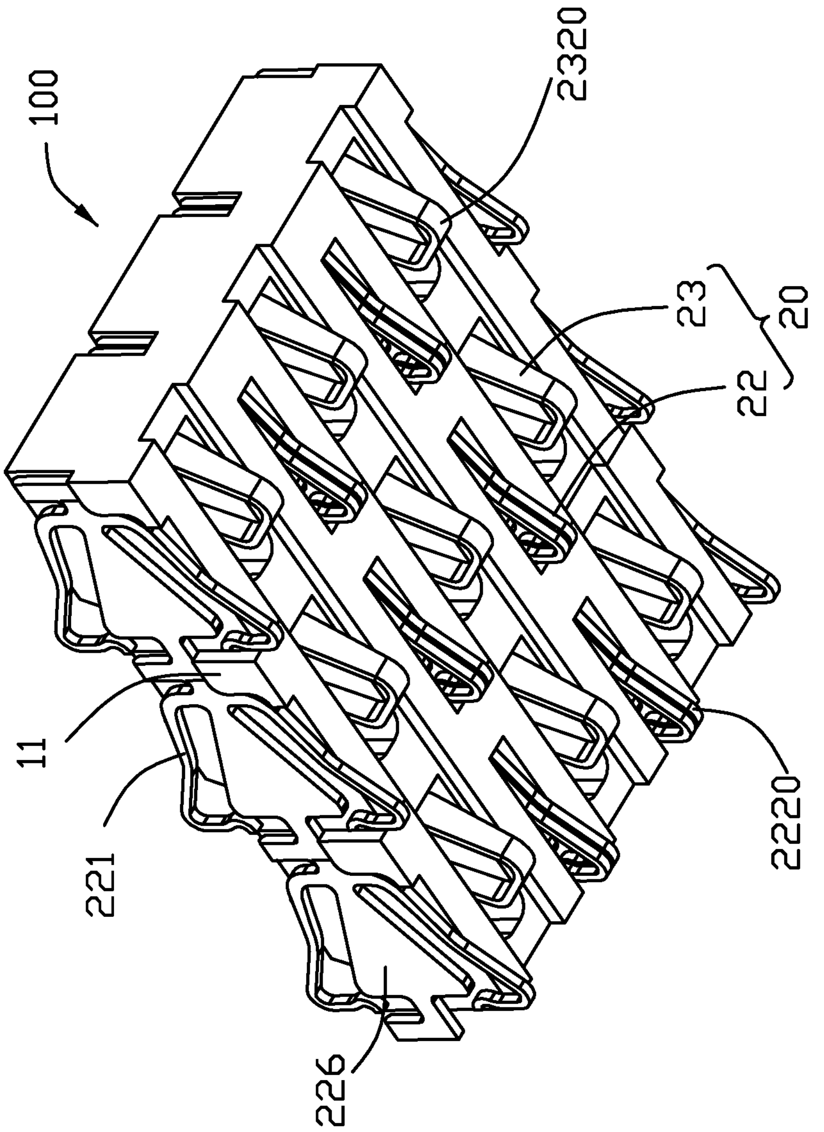
FIG. 2 is a bottom perspective of the electrical connector in FIG. 1.

Reference will now be made in detail to the preferred embodiments of the present invention.

Referring to FIGS. 1-4, an electrical connector 100 for connecting an electronic package to a main board includes an insulating housing 10 and a plurality of terminals 20 which include a plurality of first/grounding/shielding terminals 22 and a plurality of second/signal terminals 23 received in the insulating housing 10. The signal terminals 23 are arranged in a matrix and a row of the grounding terminals 22 is arranged as a whole and located on one side of each row of the signal terminals 23, that is, every two rows of the signal terminals 23 are shielded with one row of grounding terminals 22. Each signal terminal 23 includes a main part 230 retained in the housing 10, an upper elastic arm 231 with an upper contacting portion 2310 and a lower elastic arm 232 with a lower contacting portion 2320 extending obliquely from the main part 220. Each row of grounding terminals 22 are made from a metal plate. It is noted that only parts of the housing and the terminals are shown in those drawings.

Figure 5:
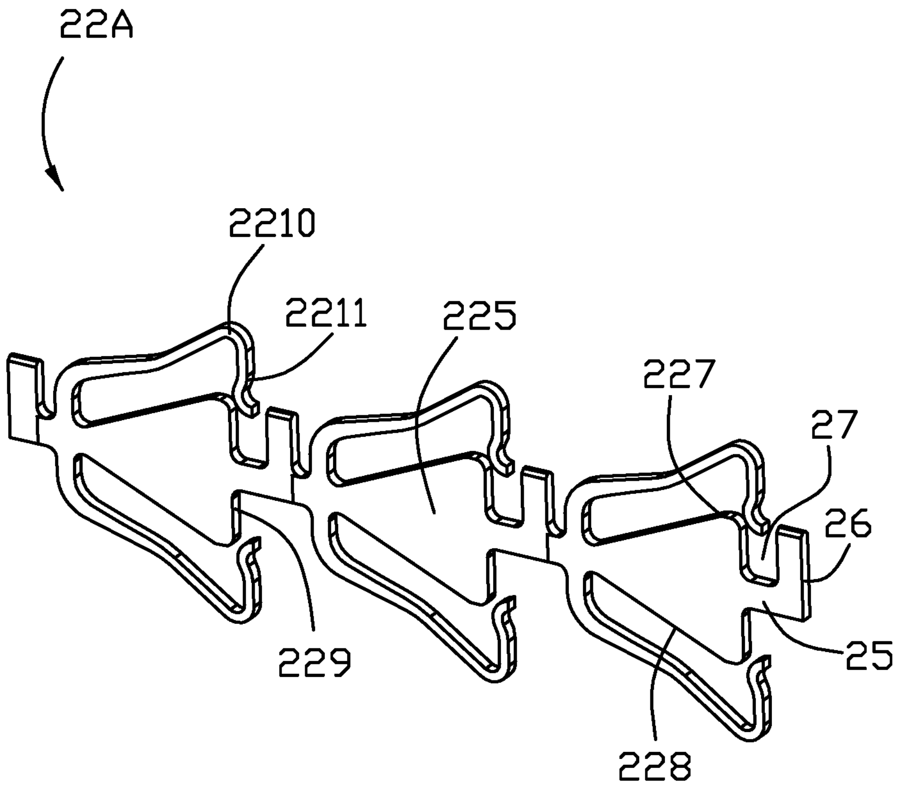
FIG. 5 is a perspective view of a row of the grounding terminals of FIG. 4.
Figure 6:
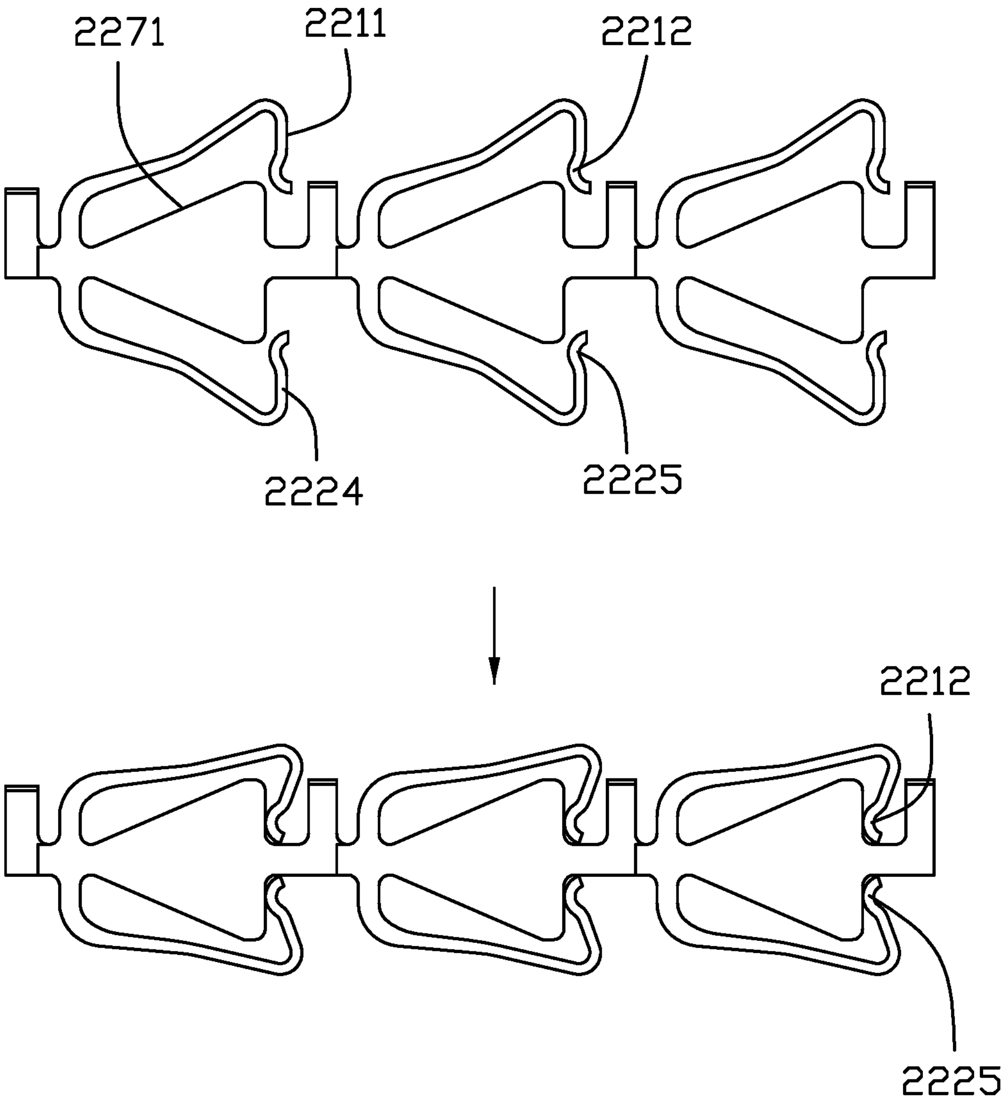
FIG. 6 is a front elevational view of the row of the grounding terminals of FIG. 5 in a free statute and a pressed statute respectively.
Figure 7:
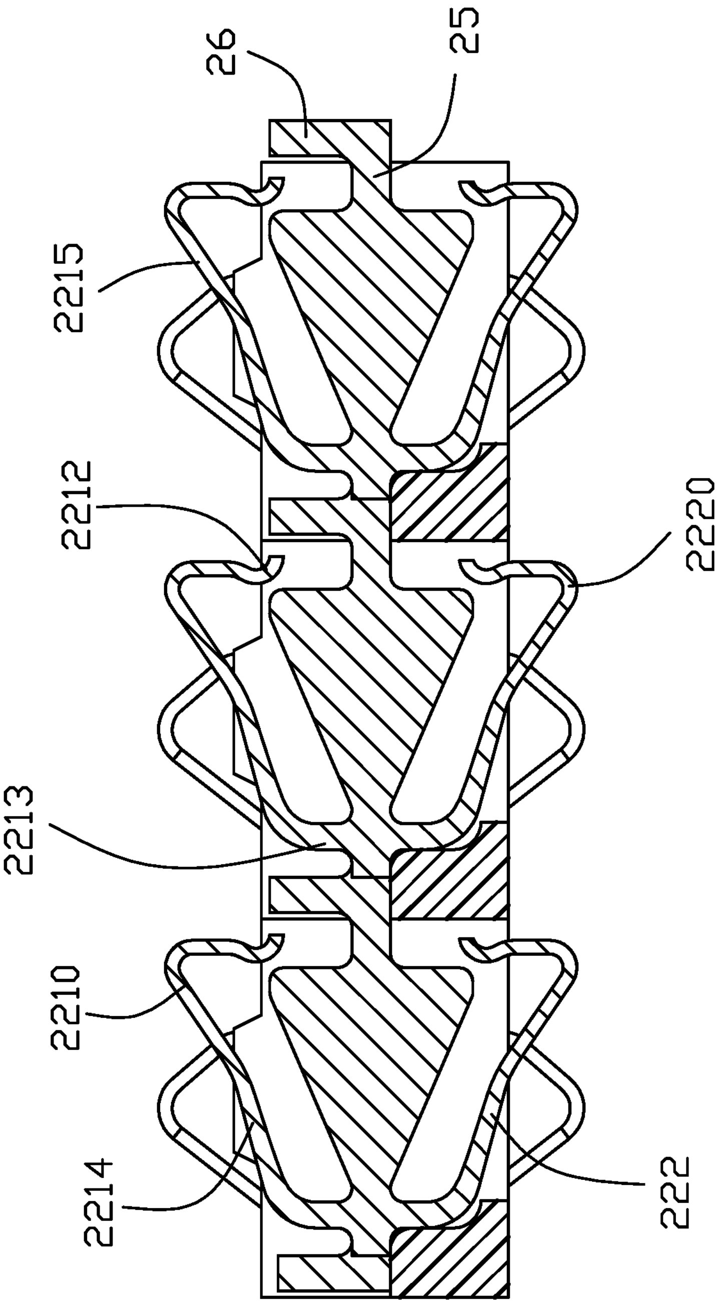
FIG. 7 is a cross-sectional view of the electrical connector taken along line 7-7 in FIG. 1.

Referring to FIGS. 4-7, each of the grounding terminals 22 includes a main part/shielding part 220 extending upright and transversely and retained in the housing, an upper elastic arm 221 and a lower elastic arm 222 extending obliquely from the main part 220. The main part/shielding part 220 is located at one side of the signal terminals 22 to have a shielding effect, and the elastic arms are adapted for contacting with PCB, chip and so on. The upper elastic arm 221 defines an upper contacting portion 2210 protruding upward and an upper end 2211 extending downwardly from the upper contacting portion 2210. The main part 220 has a first end 223 and a second end 224 opposite to the first end 223 and connecting with the main part 220 of an adjacent grounding terminal, a front side face 225 and a rear side face 226, and an upper face 227 and a lower face 228. The second end 224 defines an end face 229 facing the adjacent grounding terminal. The upper elastic arm 221 extends from the upper face 227 and inclines upwardly from the first end 223 toward the second end 224. The upper end 2211 defines an upper abutting portion 2212 protruding toward the end face 229 of the second end 224 and the upper abutting portion 2212 contacts with the end face 229 of the second end 224 when the upper elastic arm is pressed downward. The lower elastic arm 222 is in a mirror-image relationship with the upper elastic arm 221. The grounding terminals 22 are of a blanking type which is made from a metal plate. Therefore, the upper elastic arm 221 and the lower elastic arm 222 are in a same plate with the main part 220. The end face 229, the upper face 227 and the lower face 228 are of cutting faces when the terminal are punched from the metal plate and have a same thickness in a front-rear direction. As shown in FIG. 7, the upper elastic arm 221 includes an upright part 2213 extending upwardly from the upper face 227 of the main part 220 at the first end, a first inclining part 2214 extending upwardly and obliquely from the upright part 2213 towards the second end 224 and a second inclining part 2215 slanting upward more than the first including part 2214 and the upper end 2211 which then is folded downwardly in an upright direction. The second inclining part 2215 and the upper end 2211 are formed in an inverse-V shape. The upper contacting portion 2210 is formed at a junction of the second inclining part 2215 and the upper end 2211. The lower elastic arm has a similar shape. The upper face 227 and the lower face 228 are inclined, the width of the main part 220 at the first end is smaller than that at the second end and the upper face 227 is spaced from the first and second inclining parts 2214, 2215, so the main part is of a substantial triangle formed with the upper and lower face and the end face.

The upper and lower elastic arms 221, 222 have a same thickness in the front-rear direction. The row of the grounding terminals 22 is arranged as a whole, which forms a whole grounding plate 22A. Two grounding plates 22A stacked in parallel are placed between two adjacent rows of the signal terminals 23 to ensure a sufficient strength for the upper and lower elastic arms 221, 222, as shown in FIG. 3.

Referring to FIGS. 5-7, the upper end 2211 extends upright downward from the upper contacting portion 2210, and then protrudes toward the end face 229 of the second end 224. The grounding terminal 22 further includes a connecting part 25 extending transversely outward from the middle of the end face 229 for connecting with the first end 223 of an adjacent grounding terminal 22 and a strip connecting part 26 extending upwardly from the connecting part 25. A groove 27 is formed between the end face 229 of the second end 224 and the connecting part 225 and the strip connecting part 26. The upper abutting portion 2212 comes into the groove 27 and contacts with the end face 229. In this embodiment, the end face 229 of the second end 224 is of an upright face. Alternatively, the end face can be inclined. The upper face 227 defined an inclining face 2271. The lower face 228 and the upper face 227 are symmetrically arranged along the upper-lower direction, and the lower elastic arm 222 and the upper elastic arm 221 are symmetrically arranged along the upper-lower direction, too. The lower elastic arm 222 defines a lower contacting portion 2220 and a lower end 2224 extending upwardly from the lower contacting portion 2220. The lower end 2224 has a lower abutting portion 2225 protruding toward the end face 229 of the second end 224 and the lower abutting portion 2225 can get contact with the end face 229 of the second end 224 when the lower elastic arm 222 is pressed.

Alternatively, the upper elastic arm 221 can also be formed in such a manner that the upper abutting portion 2212 protrudes toward the connecting part 26 and can get contact with the side face of the connecting part 26 in the groove 27 when the upper elastic arm 221 is pressed. In other embodiments, the groove 27 can also be formed by an opening on the main part and going through the upper face 227, the upper abutting portion 2212 comes into in the groove 27 and protrudes toward one of the side faces of the groove 27 and can get contact with one side face when the upper elastic arm 221 is pressed.

Figure 3:
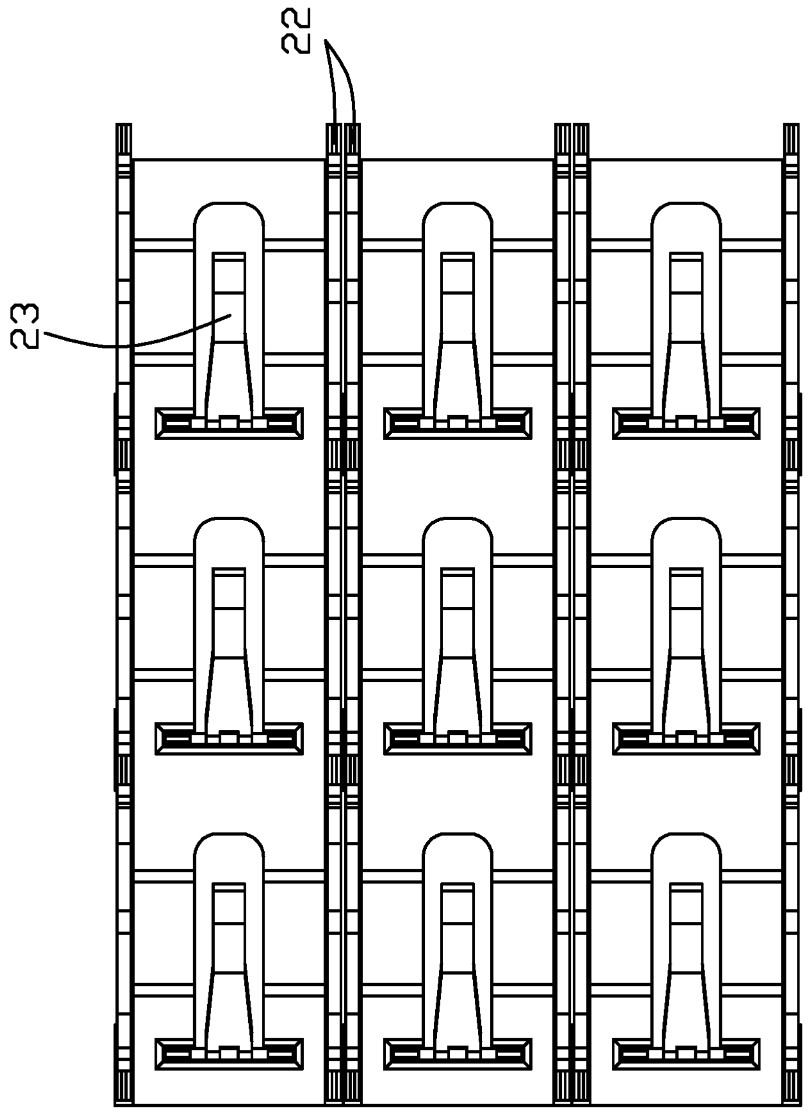
FIG. 3 is a top elevational view of the electrical connector in FIG. 1.
Figure 4:
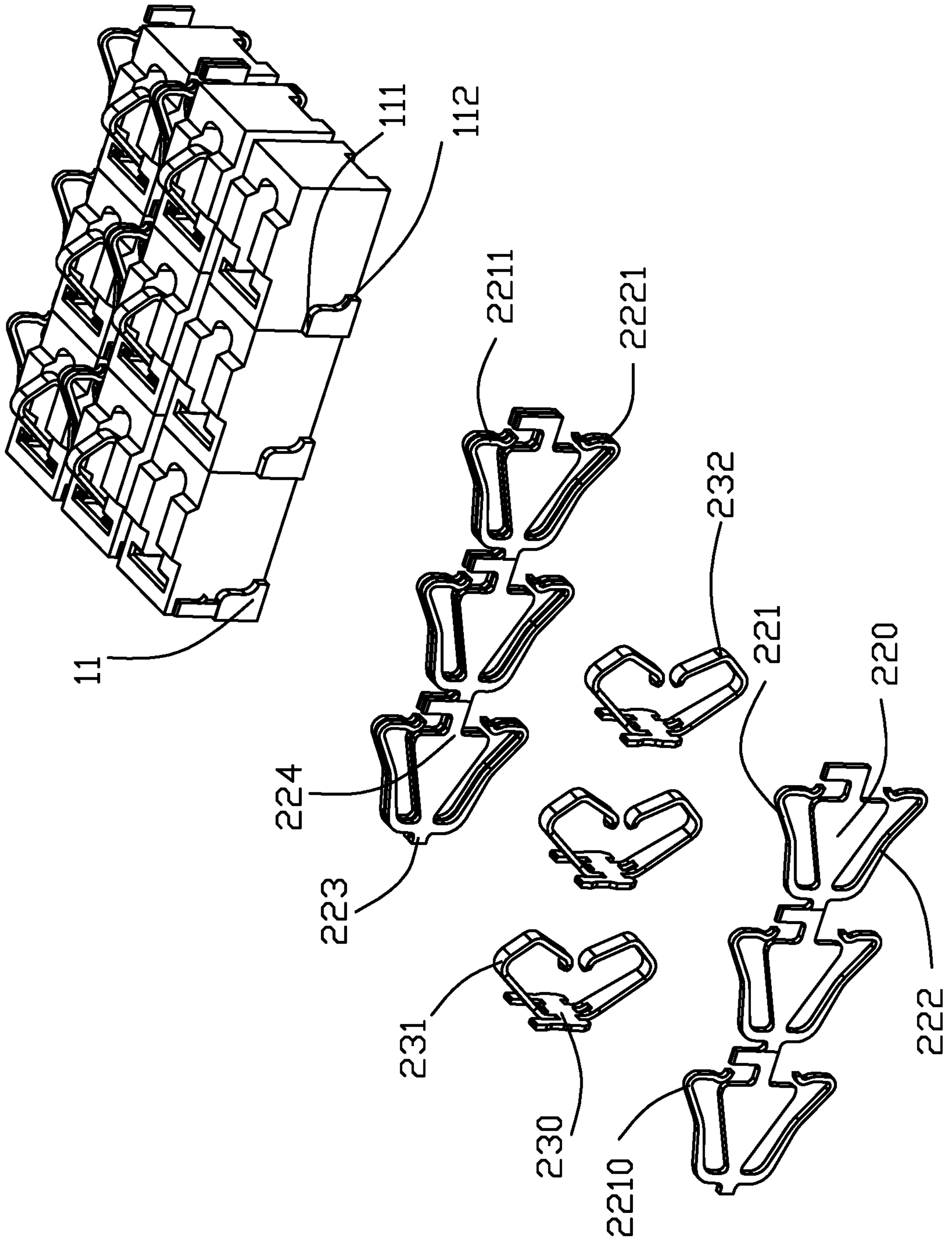
FIG. 4 is a partially exploded perspective view of the electrical connector of FIG. 1.

Referring to FIGS. 1 and 3-4, the insulating housing 10 is provided with plural supporting parts 11 for supporting the grounding plates 22A, each supporting part includes an upper supporting face 111 and a side supporting face 112, the upper supporting face 111 is supported under the junction of the connecting part 25 and the first end of the adjacent grounding terminal 22, and the side supporting face 112 is supported under the first end of the lower elastic arm 222, thus, grounding plates 22A can be assemble into the insulating housing 10 easily. The upper contacting portion 2310 of the signal terminal 23 and the upper contacting portion 2210 of the grounding terminal 22 are offset from each other, and the lower contacting portion 2320 of the signal terminal 23 and the lower contacting portion 2220 of the grounding terminal 22 are offset from each other.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:
an insulating housing;
plural rows of signal terminals disposed in the insulating housing; and
plural rows of grounding terminals disposed in the insulating housing and between every two adjacent rows of signal terminals, each of the grounding terminals comprising a main part retained in the insulating housing and an upper elastic arm and a lower elastic arm, the upper elastic arm having an upper contacting portion and an upper end folded downward from the upper contacting portion, the lower elastic arm having a lower contacting portion and a lower end folded upwards from the lower contacting portion; wherein
the main part defines a first end, a second end opposite to the first end, an upper face, and a lower face, the second end defines an end face facing an adjacent grounding terminal, the upper elastic arm extends from the upper face at the first end toward the second end, the lower elastic arm extends from the lower face at the first end toward the second end, and the upper end and the lower end touch the end face when the upper and lower elastic arms are pressed toward each other.

2. The electrical connector as claimed in claim 1, wherein the upper face and the lower face are symmetrically arranged along an upper-lower direction, and the upper elastic arm and the lower elastic arm are symmetrically arranged along the upper-lower direction.

3. The electrical connector as claimed in claim 1, wherein the row of grounding terminals is unitary and forms an integral grounding plate, and two grounding plates are stacked in parallel and located in a same slot defined on the insulating.

4. The electrical connector as claimed in claim 1, wherein each signal terminal is formed to have an upper contacting portion and a lower contacting portion, the upper contacting portion of the signal terminal and the upper contacting portion of the grounding terminal are offset from each other, and the lower contacting portion of the signal terminal and the lower contacting portion of the grounding terminal are offset from each other.

5. The electrical connector as claimed in claim 1, wherein the grounding terminal comprises a connecting part extending from a middle of the end face and connecting with the first end of the adjacent grounding terminal so the row of grounding terminals are united as a metal plate.

6. The electrical connector as claimed in claim 5, wherein a strip connecting part extends upwardly from an upper edge of the connecting part, and a lower edge of the connecting part seats on a portion of the insulating housing when the row of grounding terminals is received in a slot defined on the insulating housing.

7. The electrical connector as claimed in claim 6, wherein the strip connecting part is located between the end face and the first end of the adjacent grounding terminal.

8. The electrical connector as claimed in claim 1, wherein the upper face and the lower face are of an oblique straight line extending from the first end to the second end so that a width of the first end is smaller than a width of the second end.

9. The electrical connector as claimed in claim 8, wherein the end face is of an upright straight line.

10. An electrical connector comprising:

an insulating housing; and a plurality of first terminals disposed in the insulating housing, each first terminal comprising a main part extending in an upright direction and a transverse direction and defining a first end and a second end in the transverse direction, an upper elastic arm slanting from an upper face of the main part from the first end to the second end, the upper elastic arm defining an upper contacting portion and an upper end extending downward from the upper contacting portion; wherein the second end defines an end face, the upper end protrudes toward the end face and comes to contact with the end face when the upper elastic arm is pressed downward;

wherein the plurality of the first terminals are arranged in a row in the transverse direction and connected with each other by a transverse connecting part, and the transverse connecting part extends from the end face of the second end and connects with the first end of an adjacent first terminal.

11. The electrical connector as claimed in claim 10, wherein the first terminal comprises an upright connecting part extending upwardly from the transverse connecting part, and the upright connecting part is located between the end face and the first end of the adjacent first terminal.

12. The electrical connector as claimed in claim 10, wherein the upper end extends vertically downward from the contacting portion to define an arc-shaped portion which protrudes toward the end face.

13. The electrical connector as claimed in claim 10, wherein two first terminals are stacked side by side and commonly received in a slot defined on the insulating housing.

14. An electrical connector comprising:

an insulating housing; and a metal plate retained in a slot defined on the insulating housing, the metal plate comprising a plurality of first terminals connecting with each other in a transverse direction, each of the first terminals comprising a shielding part defining an upper face and a lower face, and an upper elastic arm and lower elastic arm slantwise extending from a first end to a second end of the shielding part;

wherein each of the upper elastic arm and the lower elastic arm defines a free end bending toward each other and slides along an end face of the second end of the shielding part when the upper elastic arm and lower elastic arm are pressed towards each other.

15. The electrical connector as claimed in claim 14, wherein the shielding part is of a triangle formed with the upper and lower faces and the end face.

16. The electrical connector as claimed in claim 14, wherein a transverse connecting part extends from the end face and connects with the first end of an adjacent first terminal.

17. The electrical connector as claimed in claim 16, wherein an upright connecting part extends upwards from an upper edge of the transverse connecting part, and a lower edge of the transverse connecting part seats on a part of the insulating housing.

* * * * *